United States Patent [19]

Nagasawa et al.

[11] Patent Number: 5,341,650
[45] Date of Patent: Aug. 30, 1994

[54] AIR CONDITIONING APPARATUS HAVING A PLURALITY OF INLETS FOR TAKING IN INDOOR AIR AT A PLURALITY OF PORTIONS OF MAIN BODY THEREOF

[75] Inventors: Atsushi Nagasawa, Mishima; Keiichi Morita, Fujinomiya; Masaya Yamazaki, Shizuoka; Yoshinori Katagami, Yokohama; Masaru Shinoda, Warabi; Takeshi Matsuo, Fujinomiya; Masaru Misawa, Fuji, all of Japan

[73] Assignee: Kabushiki Kaisha Toshiba, Kawasaki, Japan

[21] Appl. No.: 10,338

[22] Filed: Jan. 28, 1993

[30] Foreign Application Priority Data

Mar. 13, 1992 [JP] Japan .................................. 4-054719
Mar. 13, 1992 [JP] Japan .................................. 4-055298

[51] Int. Cl.$^5$ .......................................... F25D 17/06
[52] U.S. Cl. ........................................ 62/180; 62/186
[58] Field of Search .............. 62/180, 177, 179, 173, 62/176.5, 229, 186; 236/49.3, 1 B; 165/16, 34; 454/229, 231, 232, 233

[56] References Cited

FOREIGN PATENT DOCUMENTS

| 391933 | 12/1990 | Austria . | |
|---|---|---|---|
| 0438037 | 7/1991 | European Pat. Off. . | |
| 0052148 | 3/1984 | Japan | 62/180 |
| 0115920 | 7/1984 | Japan | 62/186 |
| 59-172921 | 11/1984 | Japan . | |
| 2210157 | 6/1989 | United Kingdom . | |

Primary Examiner—Harry B. Tanner
Attorney, Agent, or Firm—Cushman, Darby & Cushman

[57] ABSTRACT

A first inlet is formed in the front portion of the box of an indoor unit, and a second inlet is formed in the upper portion of the box of the indoor unit. Openable/closable covers are provided to the second inlet. The covers are closed when a silent operation mode is set by an operation unit. When the covers are closed, the second inlet is closed, and the sound caused by a hissing indoor fan in the indoor unit and the sound of the refrigerant flowing in the indoor heat exchanger of the indoor unit will not leak to the outside of the indoor unit.

12 Claims, 16 Drawing Sheets

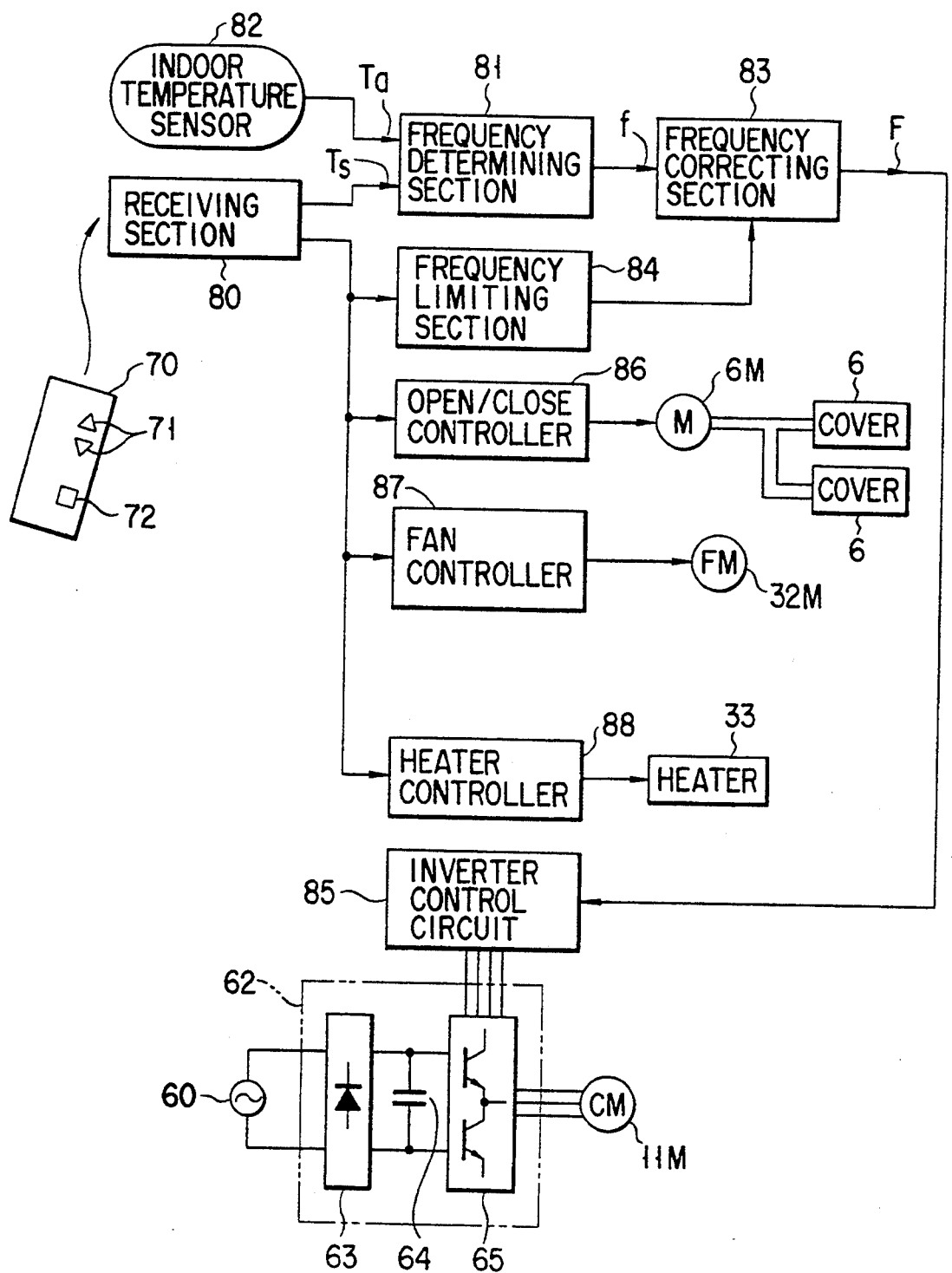
F I G. 4

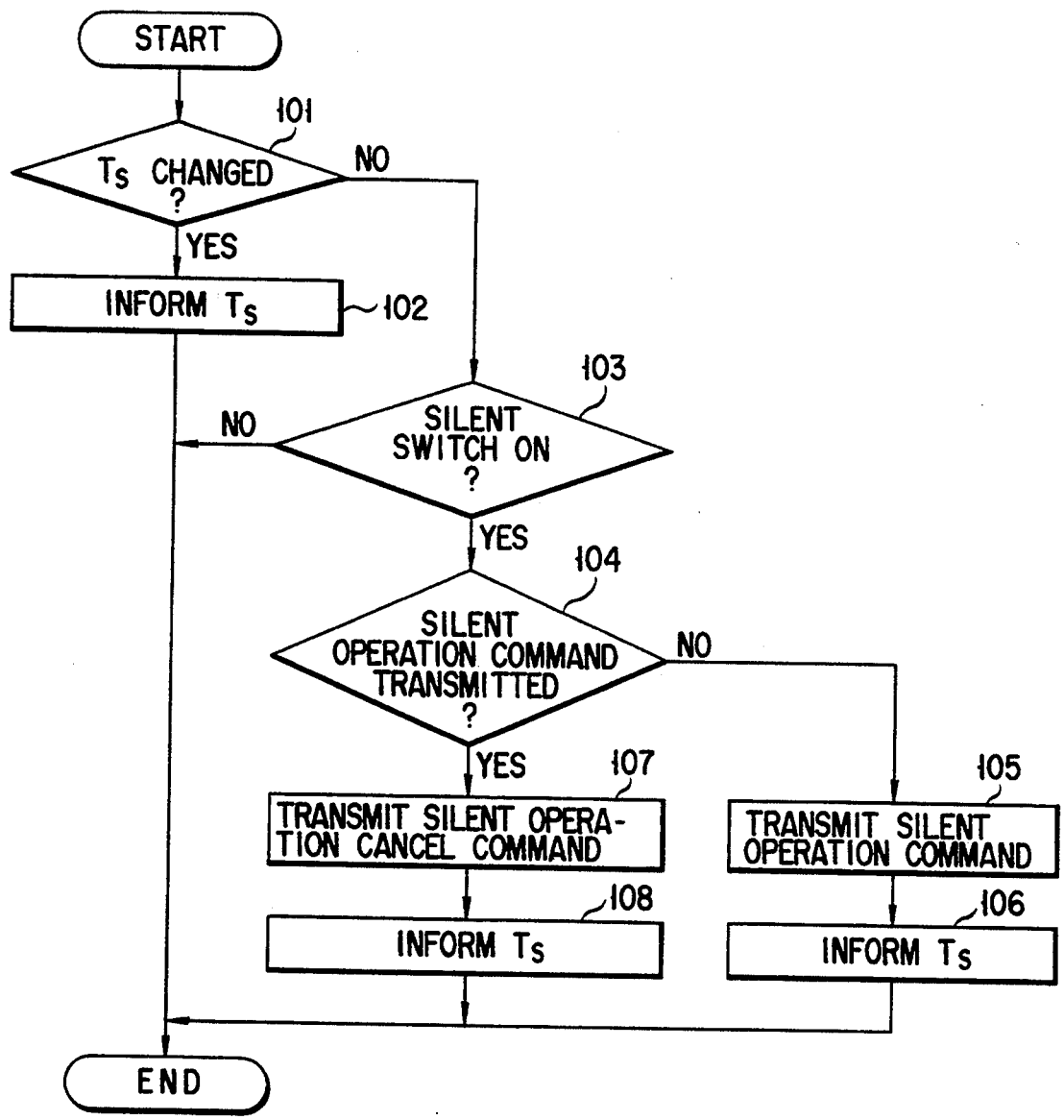
F I G. 5

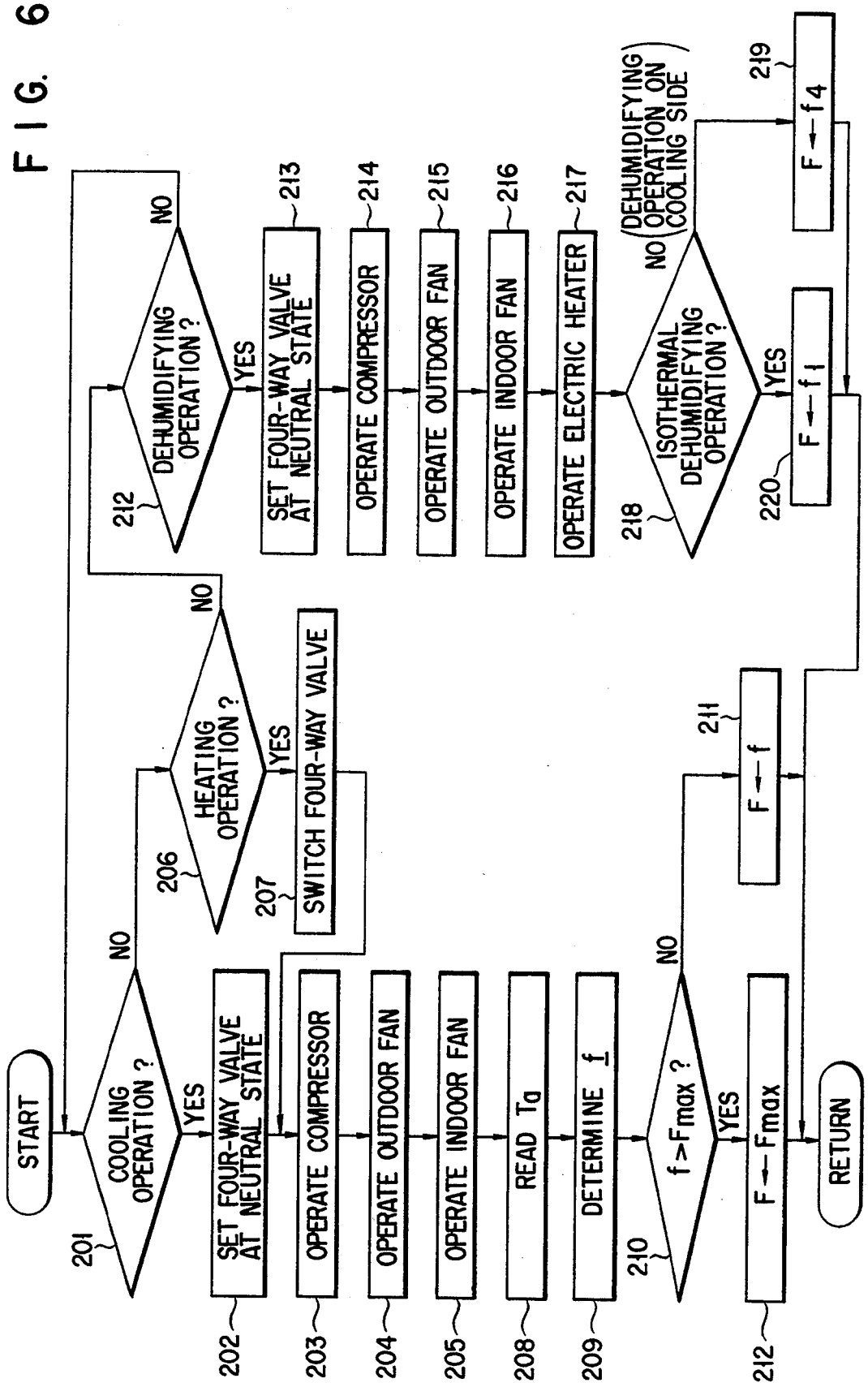

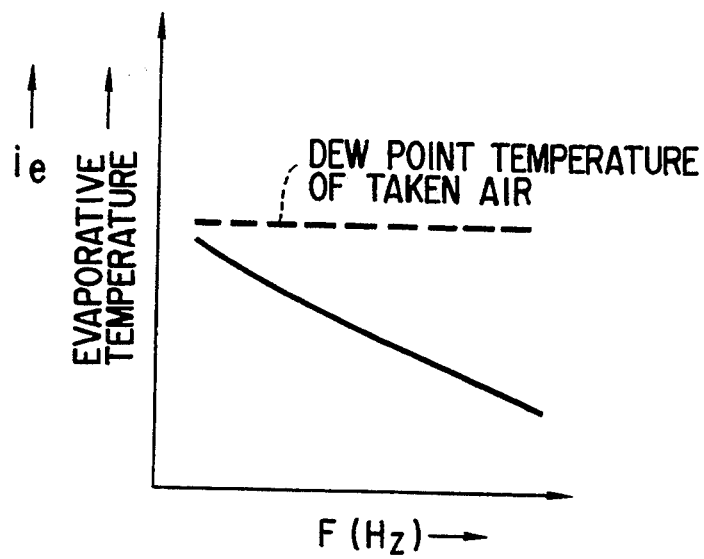
F I G. 10
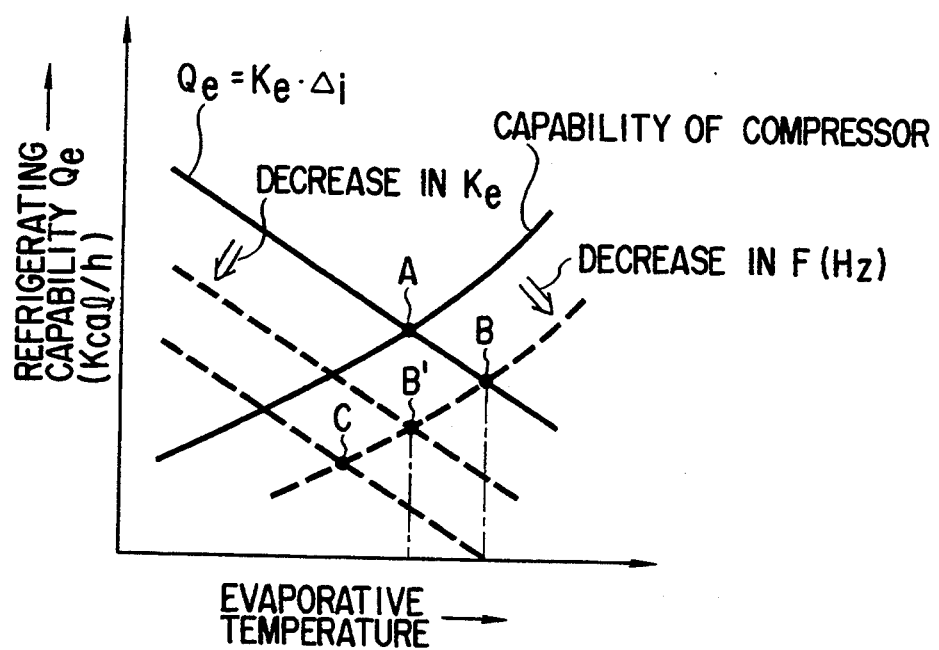
F I G. 11

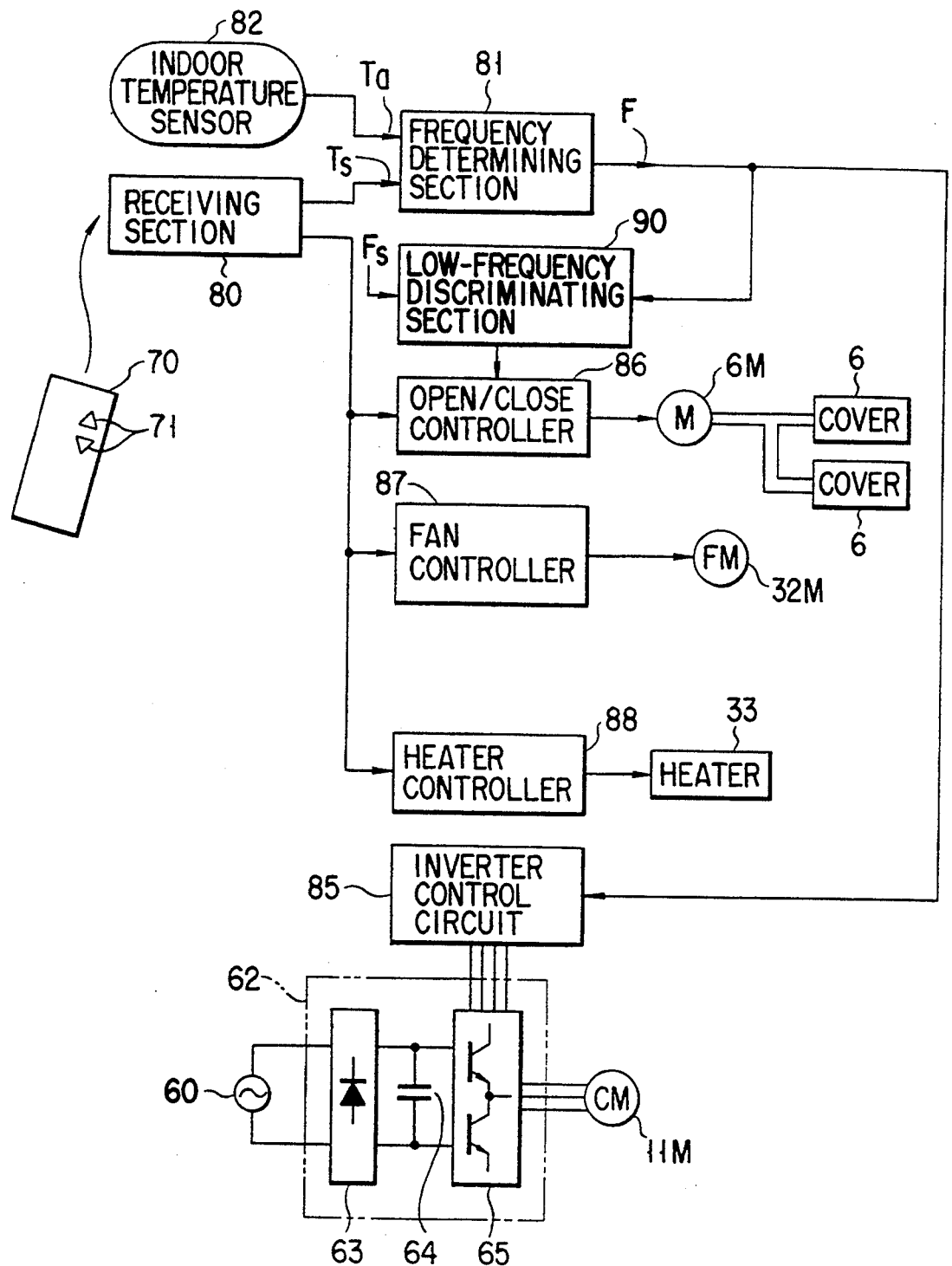
F I G. 14

AIR CONDITIONING APPARATUS HAVING A PLURALITY OF INLETS FOR TAKING IN INDOOR AIR AT A PLURALITY OF PORTIONS OF MAIN BODY THEREOF

BACKGROUND OF THE INVENTION

1. Field of the Invention

The present invention relates to an air conditioning apparatus having inlets for taking in indoor air at the front portion and upper portion of the indoor unit.

2. Description of the Related Art

Generally, the indoor unit of an air conditioning apparatus has an inlet at its front portion and an outlet at its lower portion. An air passage is formed from the inlet to the outlet, and an indoor heat exchanger and an indoor fan are provided along the air passage. Hence, when the indoor fan is operated, indoor air is taken in through the inlet, passes through the indoor heat exchanger, and is discharged into the room through the outlet.

An example of such an air conditioning apparatus is an apparatus described in Published Unexamined Japanese Utility Model Application No. 59-172921. In this air conditioning apparatus, an inlet is formed at an front portion of an indoor unit, and an outlet is formed at the lower portion of the indoor unit. An air passage is formed from the inlet to the outlet, and an indoor heat exchanger and an indoor fan are provided along the air passage. An inlet grill is provided to the inlet. The inlet grill can be manually opened/closed. When the air conditioning apparatus is not to be used for a long period of time, the inlet grill is closed, so that dust will not enter the indoor unit.

Another example of the indoor unit is an indoor unit having inlets at its front and upper portions, respectively. In this case, an indoor heat exchanger is provided to oppose the respective inlets. That is, although the size of the indoor unit is decreased, a sufficiently large heat exchange area of the indoor heat exchanger is assured.

However, in this indoor unit having the inlets at its front and upper portions, respectively, the sound caused by the hissing indoor fan and the sound caused by the refrigerant flowing in the indoor heat exchanger leak to the ceiling of the room through the upper inlet and are reflected by the ceiling, which are regarded as noise by the person in the room. This noise gives discomfort to the person in the room.

In an air conditioning apparatus having a heat pump type refrigerating cycle, a cooling operation can be executed by operating the indoor heat exchanger as an evaporator, and a heating operation can be executed by operating the indoor heat exchanger as a condenser.

In some air conditioning apparatuses each having the heat pump type refrigerating cycle, a reheater is provided downstream the indoor heat exchanger, so that the apparatus has a function of a dehumidifying operation in addition to the functions of the cooling and heating operations. In the dehumidifying operation, the indoor heat exchanger serves as an evaporator, and the reheater is operated, so that air cooled and dehumidified by the indoor heat exchanger is heated by the reheater and discharged into the room. That is, dehumidified air whose temperature is not excessively low is discharged into the room.

There are a plurality of types of dehumidifying operations, e.g., a mode of a dehumidifying operation on the cooling side wherein the temperature of air discharged into the room is lower than the indoor temperature, an isothermal dehumidifying operation mode wherein air discharged into the room is maintained at substantially the same temperature as that of the indoor temperature, and a mode of a dehumidifying operation on the heating side wherein the temperature of air discharged into the room is higher than the indoor temperature.

In an air conditioning apparatus using an electric heater as the reheater, in the mode of the dehumidifying operation on the cooling side, the capability of the compressor is set to a predetermined value or more, and the cooling capacity of the indoor heat exchanger is increased. In the isothermal dehumidifying operation mode, the capability of the compressor is set to a predetermined value or less, and the cooling capacity of the indoor heat exchanger is decreased.

It must be noted that, in the air conditioning apparatus described above which has the inlets at the plurality of portions of the indoor unit to increase the heat exchange area in the indoor heat exchanger, even when the isothermal dehumidifying operation mode is set, since the heat exchange quantity of the indoor heat exchanger is large, the temperature of air discharged into the room is largely decreased, and the obtained air conditioning result is the same as that obtained in the mode of the dehumidifying operation on the cooling side. As a result, the person in the room feels chilly.

In order to solve this inconvenience, the capacity of the electric heater serving as the reheater may be increased. However, in the recent trend of the size reduction of the indoor unit, the electric heater and other components are close to each other. Thus, when the capacity of the electric heater is excessively increased, heat generated by the electric heater adversely affects other components.

As an alternative way of solving the above inconvenience, the capability of the compressor may be decreased as low as possible. When, however, the capability of the compressor is excessively decreased, the evaporative temperature of the refrigerant in the indoor heat exchanger is increased, and in an extreme case, the temperature of the discharged indoor air cannot be maintained at a dew point temperature or less, and the dehumidifying function is disabled.

In order to solve this problem, the capability of the compressor may be decreased as low as possible, and at the same time the blowing air quantity of the indoor fan may be decreased. That is, the heat exchange efficiency of the indoor heat exchanger is degraded to suppress an increase in evaporative temperature. In this case, however, since the blowing air quantity of the indoor fan must be extremely decreased, the air conditioning efficiency becomes poor, and a sufficiently high dehumidifying effect cannot be obtained.

SUMMARY OF THE INVENTION

It is the primary object of the present invention to enable a silent operation by decreasing noise leaking from inlets, or to enable an appropriate isothermal dehumidifying operation without increasing the size of a reheater.

According to the present invention, there is provided an air conditioning apparatus having a plurality of inlets for taking in indoor air at a plurality of portions of a main body. The present invention includes an open-/closable cover for at least one of the inlets. A control is provided for opening the cover to execute an operation. Another control is used to close the cover to execute an operation. The present invention can be set to a silent operation mode. When set in the silent mode one of the controls is set and if the silent mode is not set the other control is set.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing the main part of a controller of the first embodiment of the present invention;

FIG. 5 is a flow chart for explaining the operation of an operation unit of each embodiment;

FIG. 6 is a flow chart for explaining the cooling, heating, and dehumidifying operations of each embodiment;

FIG. 10 is a graph showing the characteristics of the refrigerating cycle of each embodiment;

FIG. 11 is a graph showing the characteristics of the refrigerating cycle of each embodiment;

FIG. 14 is a block diagram showing the main part of a controller according to the third embodiment of the present invention;

DETAILED DESCRIPTION OF THE PREFERRED EMBODIMENTS

The first embodiment of the present invention will be described with reference to the accompanying drawings.

Figure 1:
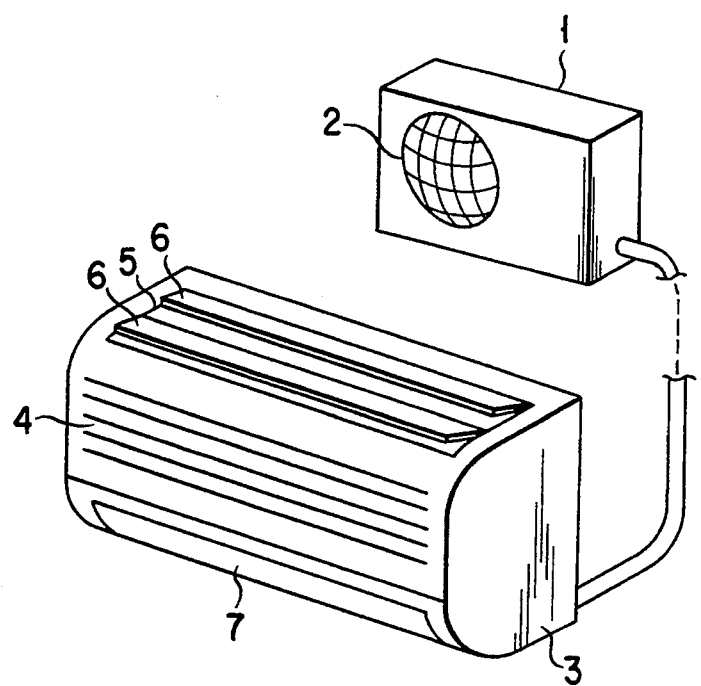
FIG. 1 is a view showing the arrangement of an outdoor unit and an indoor unit of each embodiment of the present invention.

As shown in FIG. 1, an outdoor unit 1 has an inlet grill 2. The outdoor unit 1 is connected to an indoor unit 3 through piping and wiring.

The indoor unit 3 has a first inlet 4 for taking in indoor air at its front portion and a second inlet 5 for taking in indoor air at its upper portion. Two covers 6 are provided in the second inlet 5 to be operable/closable. Each cover 6 is automatically opened/closed by a driving mechanism having a motor 6M (to be described later; e.g., a stepping motor) as a power source. An outlet 7 is formed at the lower portion of the indoor unit 3.

Figure 2:
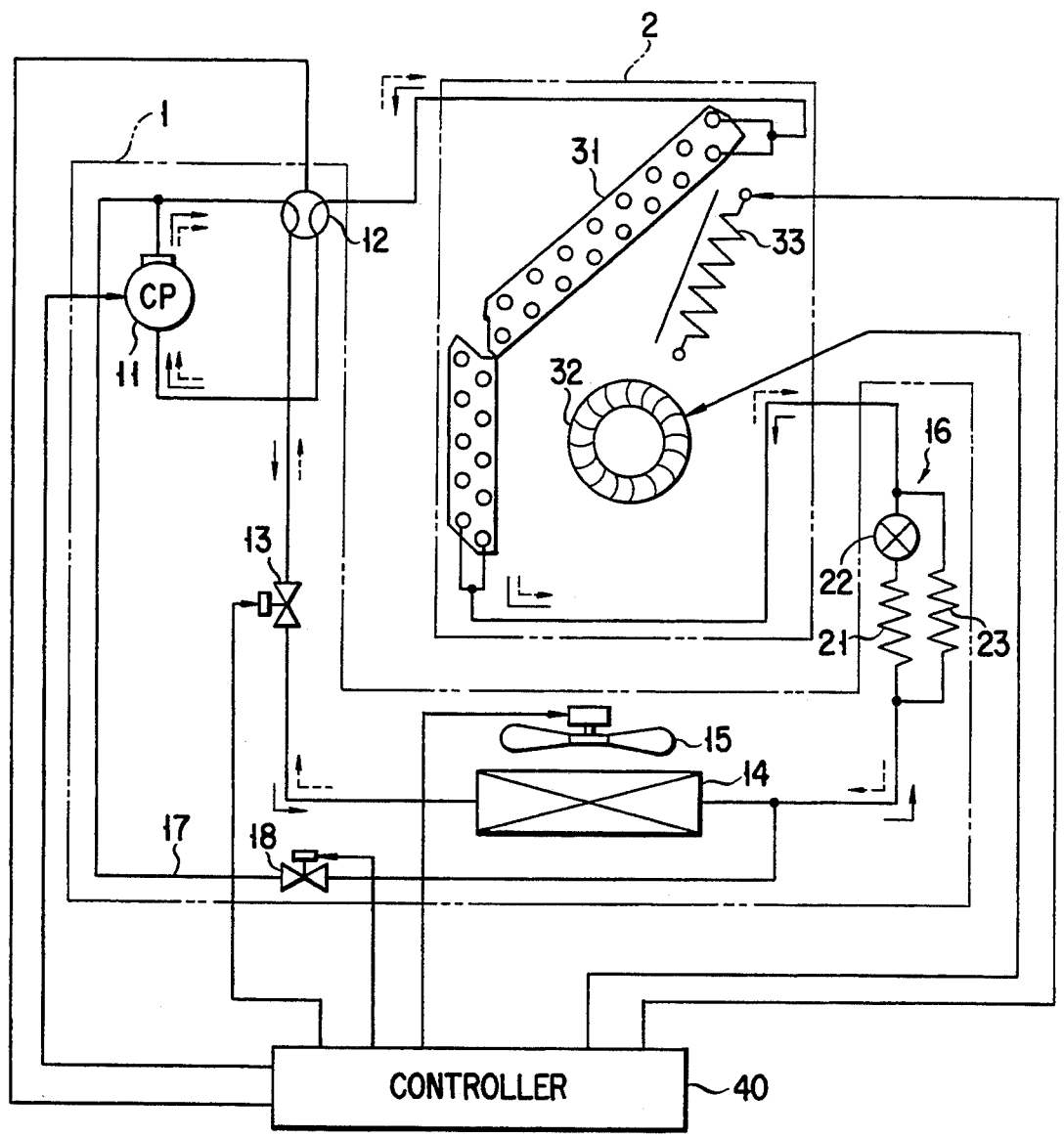
FIG. 2 is a diagram showing the arrangement of a refrigerating cycle and a control circuit of each embodiment of the present invention.

As shown in FIG. 2, a variable-capability compressor 11, a four-way valve 12, a two-way valve 13, an outdoor heat exchanger 14, an outdoor fan 15, a pressure reducing circuit 16, a bypass 17, and a two-way valve 18 are housed in the outdoor unit 1.

The compressor 11 takes in, compresses, and discharges the refrigerant. The two-way valve 13 is opened during operation and closed when the operation is stopped. The outdoor heat exchanger 14 exchanges heat of the refrigerant flowing to it for heat of outer air. The pressure reducing circuit 16 is constituted by connecting a capillary tube 23 in parallel to a series circuit of a capillary tube 21 and an expansion valve 22. The bypass 17 constitutes a defrosting circuit together with the two-way valve 18, and is rendered conductive when it defrosts the outdoor heat exchanger 14.

An indoor heat exchanger 31, an indoor fan 32, and an electric heater 33 serving as a reheater are housed in the indoor unit 3. The indoor heat exchanger 31 exchanges heat of the refrigerant flowing to it for heat of indoor air. The indoor fan 32 takes in indoor air into the indoor unit 3 through the inlets 4 and 5 to be described later and discharges taken air into the room through the indoor heat exchanger 31. The electric heater 33 operates in the dehumidifying operation.

The compressor 11, the four-way valve 12, the two-way valve 13, the outdoor heat exchanger 14, the pressure reducing circuit 16, and the indoor heat exchanger 31 are sequentially connected through piping, thus constituting a heat pump type refrigerating cycle. More specifically, during the cooling operation, the four-way valve 12 is set at a neutral state so that the refrigerant discharged from the compressor 11 flows in a direction of arrows indicated by solid lines in FIG. 2, and the outdoor heat exchanger 14 serves as the condenser and the indoor heat exchanger 31 serves as the evaporator. During the heating operation, the four-way valve 12 is switched so that the refrigerant discharged from the compressor 11 flows in a direction of arrows indicated by broken lines in FIG. 2, and the indoor heat exchanger 31 serves as the condenser and the outdoor heat exchanger 14 serves as the evaporator.

Reference numeral 40 denotes a controller which comprises a microcomputer and its peripheral circuits and controls the entire operation of the air conditioning apparatus. The compressor 11, the four-way valve 12, the two-way valve 13, the outdoor fan 15, the two-way valve 18, the indoor fan 32, and the electric heater 33 are connected to the controller 40.

Figure 3:
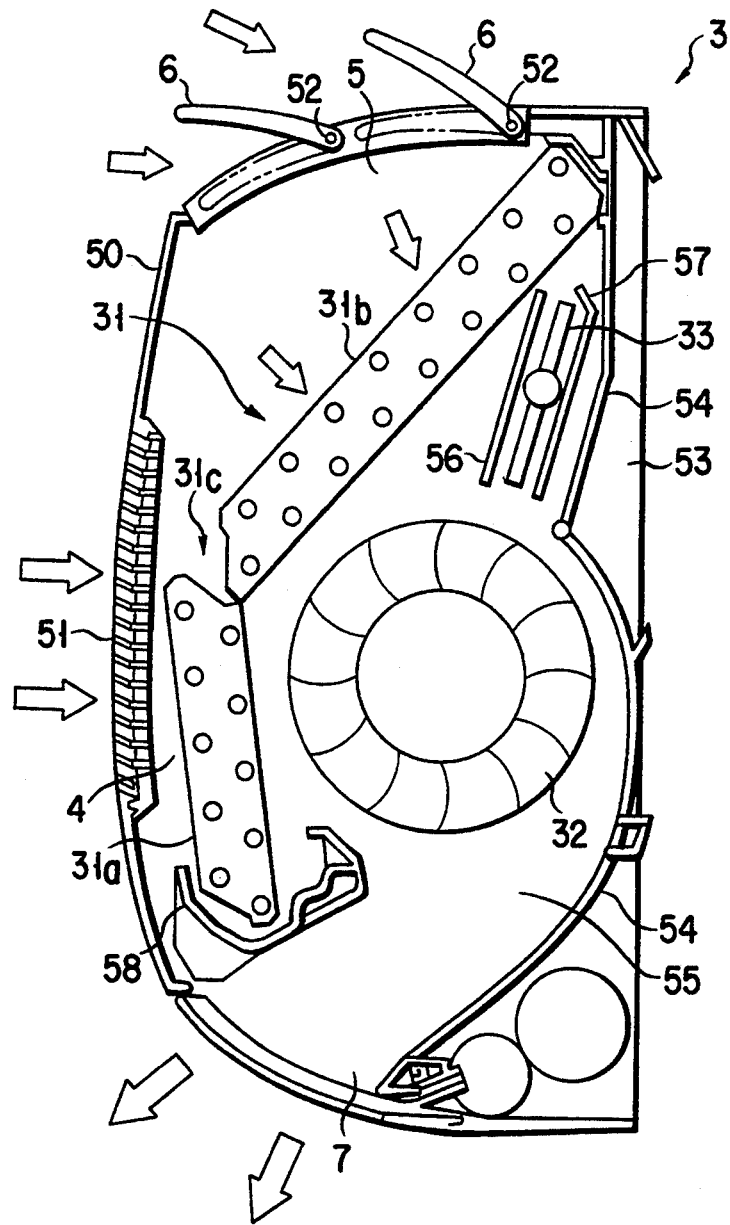
FIG. 3 is a diagram showing an indoor unit of each embodiment in detail.

FIG. 3 shows the arrangement of the indoor unit 3 in detail.

The main body of the indoor unit 3 is constituted by a box 50. The inlet 4 is formed in the front surface of the box 50, and an inlet grill 51 is fitted in the inlet 4. The inlet 5 is formed in the upper portion of the box 50, and the two covers 6 are provided to the inlet 5 to be openable/closable. The covers 6 are aligned in the front-and-back direction of the box 50, and their end portions located on their rear sides are pivotally supported by corresponding support shafts 52. When the both covers 6 are closed, the inlet 5 is completely closed.

An opening 53 is formed in the rear side of the box 50. The opening 53 has a rectangular shape whose horizontal length larger than its vertical length, and is closed by a partition plate 54. The partition plate 54 defines an air passage 55 in the box 50. The air passage 55 allows the inlets 4 and 5 to communicate with the lower outlet 7.

In the air passage 55, the indoor heat exchanger 31 is provided at a position to oppose the inlets 4 and 5. The indoor heat exchanger 31 is of a so-called finned tube type in which a refrigerant-flowing tube extends through a large number of fins. The indoor heat exchanger 31 has a notch 31c midway along its vertical direction. The notch 31c is formed in the horizontal direction of the indoor heat exchanger 31. The indoor heat exchanger 31 is bent at the notch 31c so that the indoor heat exchanger 31 has an L shape. Thus, the indoor heat exchanger 31 is divided into lower and upper lower heat exchangers 31a and 31b. The lower heat exchanger 31a opposes the inlet 4, and the upper heat exchanger 31b opposes the inlet 5.

In the air passage 55, the electric heater 33 and the indoor fan 32 are provided downstream the indoor heat exchanger 31. The indoor fan 32 is a multiblade fan which takes in the indoor air through the inlets 4 and 5 and blows the taken air from the outlet 7 into the room through the indoor heat exchanger 31. In this case, the position of the indoor fan 32 is determined such that the taken air is distributed to the lower and upper heat exchangers 31a and 31b in almost equal quantities.

A blocking plate 56 is provided between the upper heat exchanger 31b of the indoor heat exchanger 31 and the electric heater 33. The blocking plate 56 prevents heat from the electric heater 33 from being directly radiated on the upper heat exchanger 31b. A blocking plate 57 is provided between the electric heater 33 and the partition plate 54. The blocking plate 57 prevents heat from the electric heater 33 from being directly radiated on the partition plate 54.

A drain pan 58 integrally having a bellmouth is provided below the lower heat exchanger 31a.

The controller 40 has the following function means:

[1] a first control means for opening the covers 6 to execute the operation;

[2] a second control means for closing the covers 6 to execute the operation;

[3] a control means for setting the four-way valve 12 at the neutral state, flowing the refrigerant discharged from the compressor 11 to the outdoor heat exchanger 14 through the four- and two-way valves 12 and 13, flowing the refrigerant passing through the outdoor heat exchanger 14 to the indoor heat exchanger 31 through the pressure reducing circuit 16, returning the refrigerant passing through the indoor heat exchanger 31 to the compressor 11 through the four-way valve 12, and operating the outdoor and indoor fans 15 and 32, thus executing the cooling operation;

[4] a control means for switching the four-way valve 12, flowing the refrigerant discharged from the compressor 11 to the indoor heat exchanger 31 through the four-way valve 12, flowing the refrigerant passing through the indoor heat exchanger 31 to the outdoor heat exchanger 14 through the pressure reducing circuit 16, returning the refrigerant passing through the outdoor heat exchanger 14 to the compressor 11 through the two- and four-way valves 13 and 12, and operating the outdoor and indoor fans 15 and 32, thus executing the heating operation. In the heating operation, the electric heater 33 is operated as required as an auxiliary heat source;

[5] a detection means for detecting an air conditioning load based on the temperature of the indoor air in the cooling and heating operations;

[6] a control means for controlling the capability of the compressor 11 in accordance with the detected air conditioning load in the cooling and heating operations;

[7] a limiting means for controlling the upper limit of the capability of the compressor 11 at a low value upon selection of the operation of the second control means in the cooling and heating operations;

[8] a control means for setting the four-way valve 12 at the neutral state, flowing the refrigerant discharged from the compressor 11 to the outdoor heat exchanger 14 through the four- and two-way valves 12 and 13, flowing the refrigerant passing through the outdoor heat exchanger 14 to the indoor heat exchanger 31 through the pressure reducing circuit 16, returning the refrigerant passing through the indoor heat exchanger 31 to the compressor 11 through the four-way valve 12, operating the outdoor and indoor fans 15 and 32 to operate the electric heater 33, and setting the capability of the compressor 11 to a predetermined value or more, thereby executing the dehumidifying operation on the cooling side;

[9] a control means for setting the four-way valve 12 at the neutral state, flowing the refrigerant discharged from the compressor 11 to the outdoor heat exchanger 14 through the four- and two-way valves 12 and 13, flowing the refrigerant passing through the outdoor heat exchanger 14 to the indoor heat exchanger 31 through the pressure reducing circuit 16, returning the refrigerant passing through the indoor heat exchanger 31 to the compressor 11 through the four-way valve 12, operating the outdoor and indoor fans 15 and 32 to operate the electric heater 33, and setting the capability of the compressor 11 to a predetermined value or less, thereby executing the isothermal dehumidifying operation; and

[10] selecting means for selecting the operation of either the first or second control means in accordance with whether the silent operation mode (to be described later) is set or not in the cooling and heating operations, selecting the operation of the first control means in the dehumidifying operation in the cooling side, and selecting the operation of the second control means in the isothermal dehumidifying operation.

FIG. 4 shows the arrangement of the main part of the controller 40 in detail.

A commercial AC power supply 60 is connected to an inverter 62. The inverter 62 rectifies and smoothes the voltage of the power supply 60 by a rectifier 63 and a smoothing capacitor 64, respectively, converts the rectified and smoothed voltage to a voltage having a predetermined frequency by the switching operation of a switching circuit 65, and outputs the frequency-converted voltage. The output is a drive power of a compressor motor 11M. The output frequency of the inverter 62 is referred to as the operating frequency hereinafter.

Reference numeral 70 denotes a wireless operation unit or remote controller. The operation unit 70 has an operating means (not shown) for setting the various operating conditions, e.g., an operation start, an operation stop, the cooling operation, the heating operation, the dehumidifying operation on the cooling side, and the isothermal operation, and informs the set content to the indoor unit 3 by a wireless signal employing an ultraviolet ray.

As examples of the operating means provided to the operation unit 70, FIG. 4 shows a temperature set button 71 for inputting a set temperature $T_s$, and a silent operation switch 72 for setting and canceling the silent operation mode.

The ultraviolet ray emitted from the remote controller 70 is received by a receiving section 80 of the indoor unit 3. The receiving section 80 decodes the received ultraviolet ray data.

Of the data decoded by the receiving section 80, data on the set temperature $T_s$ is sent to a frequency determining section 81. The frequency determining section 81 detects the difference ($=\Delta T$) between an indoor temperature $T_a$ detected by a temperature sensor 82 and the set temperature $T_s$ as an air conditioning load, and determines an operating frequency f corresponding to the air conditioning load. The operating frequency f is informed to a frequency correcting section 83.

The data decoded by the receiving section 80 is also sent to a frequency limiting section 84, an open/close controller 86, a fan controller 87, and a heater controller 88.

The frequency limiting section 84 sets a maximum operating frequency $F_{max}$ as the upper limit of an operating frequency F. Upon reception of a silent operation command, the frequency limiting section 84 limits the maximum operating frequency to a value $f_3$; upon reception of a silent operation cancel command, it sets a maximum value $f_5$ ($>f_3$) as the maximum operating frequency $F_{max}$.

The maximum operating frequency $F_{max}$ set by the frequency limiting section 84 is informed to the frequency correcting section 83. The frequency correcting section 83 compares the operating frequency f determined by the frequency determining section 81 with the maximum operating frequency $F_{max}$ set by the frequency limiting section 84. If the operating frequency f is lower than the maximum operating frequency $F_{max}$, the frequency correcting section 83 sets this operating frequency f as the operating frequency F; if the operating frequency f is equal to or higher than the maximum operating frequency $F_{max}$, the frequency correcting section 83 sets the maximum operating frequency $F_{max}$ as the operating frequency F.

The operating frequency F is informed to an inverter control circuit 85. The inverter control circuit 85 drives the inverter 62 to obtain the operating frequency F.

The open/close controller 86 drives the motor 6M to close the covers 6 upon reception of a silent operation command in the cooling and heating operations and the dehumidifying operation on the cooling side, and drives the motor 6M to open the covers 6 upon reception of a silent operation cancel command. The open/close controller 86 also drives the motor 6M to close the covers 6 upon reception of an isothermal dehumidifying operation command.

The fan controller 87 drives a motor 32M of the indoor fan 32 upon reception of an operation start command, and stops the operation of the motor 32M upon reception of an operation stop command.

The heater controller 88 operates the electric heater 33 upon reception of the operation start command of the dehumidifying operation on the cooling side or the isothermal dehumidifying operation, and stops the operation of the electric heater 33 upon reception of an operation stop command.

The operation of the air conditioning apparatus having the above arrangement will be described. The major operation of the remote controller 70 will first be described with reference to the flow chart of FIG. 5.

When the temperature set button 71 is depressed to change the set temperature $T_s$ (Y in step 101), the changed set temperature $T_s$ is informed to the indoor unit 3 by the wireless signal (step 102).

When the silent operation switch 72 is depressed (Y in step 103), it is confirmed whether a silent operation command has already been transmitted, i.e., whether the silent operation is being executed (step 104). If the silent operation command has not been transmitted yet, a silent operation command is transmitted to the indoor unit 3 (step 105). Simultaneously, the set temperature $T_s$ at this time is informed to the indoor unit 3 (step 106). If the silent operation command has already been transmitted, a silent operation cancel command is transmitted to the indoor unit 3 (step 107). Simultaneously, the set temperature $T_s$ at this time is informed to the indoor unit 3 (step 108).

The operations of the outdoor and indoor units 1 and 3 will be described. The cooling, heating, and dehumidifying operations will be described first with reference to the flow chart of FIG. 6.

When the start of the cooling operation is designated by the operation unit 70, the four-way valve 12 is set at the neutral state, and the operations of the compressor 11, the outdoor fan 15, and the indoor fan 32 are started (steps 201, 202, 203, 204, and 205).

More specifically, the refrigerant discharged from the compressor 11 flows to the outdoor heat exchanger 14 through the four- and two-way valves 12 and 13, as indicated by solid arrows in FIG. 2. The refrigerant entering the outdoor heat exchanger 14 is liquefied by emitting its heat to the outer air. The refrigerant passing through the outdoor heat exchanger 14 flows to the indoor heat exchanger 31 through the pressure reducing circuit 16. The refrigerant entering the indoor heat exchanger 31 is evaporated by depriving the indoor air of heat. The refrigerant passing through the indoor heat exchanger 31 is taken in by the compressor 11 through the four-way valve 12. That is, the outdoor heat exchanger 14 and the indoor heat exchanger 31 serve as the condenser and the evaporator, respectively, thus executing the cooling operation.

When the start of the heating operation is designated by the operation unit 70, the four-way valve 12 is switched, and the operations of the compressor 11, the outdoor fan 15, and the indoor fan 32 are started (steps 206, 207, 203, 204, and 205).

More specifically, the refrigerant discharged from the compressor 11 flows to the indoor heat exchanger 31 through the two-way valve 12, as indicated by broken arrows in FIG. 2. The refrigerant entering the indoor heat exchanger 31 is liquefied by being deprived of its heat by the indoor air. The refrigerant passing through the indoor heat exchanger 31 flows to the outdoor heat exchanger 14 through the pressure reducing circuit 16. The refrigerant entering the outdoor heat exchanger 14 is evaporated by being heated by the outer air. The refrigerant passing through the outdoor heat exchanger 14 is taken in by the compressor 11 through the two- and four-way valves 13 and 12. That is, the indoor heat exchanger 31 and the outdoor heat exchanger 14 serves as the condenser and the evaporator, respectively, thus executing the heating operation.

In the cooling and heating operations, the indoor temperature $T_a$ detected by the temperature sensor 82 is read (step 208). The difference ($=\Delta T$) between the indoor temperature $T_a$ and the set temperature $T_s$ is detected as the air conditioning load, and an operating frequency f corresponding to this air conditioning load is determined (step 209).

The following table shows the relationship between the air conditioning load and the operating frequency f.

| $\Delta T (= T_a - T_s)$ | f (Cooling Operation) | f (Heating Operation) |
|---|---|---|
| $\Delta T > 3$ | $f_4$ | 0 (Off) |
| $3 > \Delta T > 2$ | $f_3$ | 0 |
| $2 > \Delta T > 1$ | $f_2$ | 0 |
| $1 > \Delta T > 0$ | $f_1$ | 0 |
| $0 > \Delta T > -1$ | 0 (Off) | $f_1$ |
| $-1 > \Delta T > -2$ | 0 | $f_2$ |
| $-2 > \Delta T > -3$ | 0 | $f_3$ |
| $-3 > \Delta T > -4$ | 0 | $f_4$ |
| $-4 > \Delta T$ | 0 | $f_5$ |

The maximum operating frequency $F_{max}$ is predetermined as the upper limit of the capability of the compressor 11, and the maximum operating frequency $F_{max}$ and the operating frequency f are compared (step 210). If the operating frequency f is lower than the maximum operating frequency $F_{max}$, this operating frequency f is set as the operating frequency F (step 211). If the operating frequency f is higher than the maximum operating frequency $F_{max}$, the maximum operating frequency $F_{max}$ is set as the operating frequency F (step 212). In this manner, the capability corresponding to the air conditioning load is provided by the compressor 11.

When the start of the dehumidifying operation on the cooling side is designated by the operation unit 70, the four-way valve 12 is set at the neutral state, and the operations of the compressor 11, the outdoor fan 15, and the indoor fan 32 are started (steps 212, 213, 214, 215, and 216). Simultaneously, the operation of the electric heater 33 is started (step 217). Furthermore, the operating frequency F is set at a large value, e.g., $f_4$ in order to set the capability of the compressor 11 to the predetermined value or more (steps 218 and 219).

In this case, in the same manner as in the cooling operation, the outdoor heat exchanger 14 and the indoor heat exchanger 31 serve as the condenser and the evaporator, respectively. The air cooled and dehumidified by the indoor heat exchanger 31 is heated by the electric heater 33. Hence, air to be blown into the room is heated to a temperature near the indoor temperature. Note that since the operating frequency F is set at a high frequency $f_4$, the capability of the compressor 11 is increased, and the cooling quantity of the indoor heat exchanger 31 is increased. Thus, the temperature of air to be blown into the room is maintained to be lower than the indoor temperature. That is, the dehumidifying operation on the cooling side is executed.

When the start of the isothermal dehumidifying operation is designated by the operation unit 70, the operating frequency F is set at a small value, e.g., $f_1$ ($<f_4$) (steps 218 and 220). Except that, the operation is the same as the dehumidifying operation on the cooling side.

In this case, since the operating frequency F is set at the low frequency $f_1$, the capability of the compressor 11 is decreased, and the cooling quantity of the indoor heat exchanger 31 is decreased. Then, the temperature of air to be blown into the room is maintained at almost the same as that of the indoor temperature. That is, the isothermal dehumidifying operation is executed.

Figure 7A:
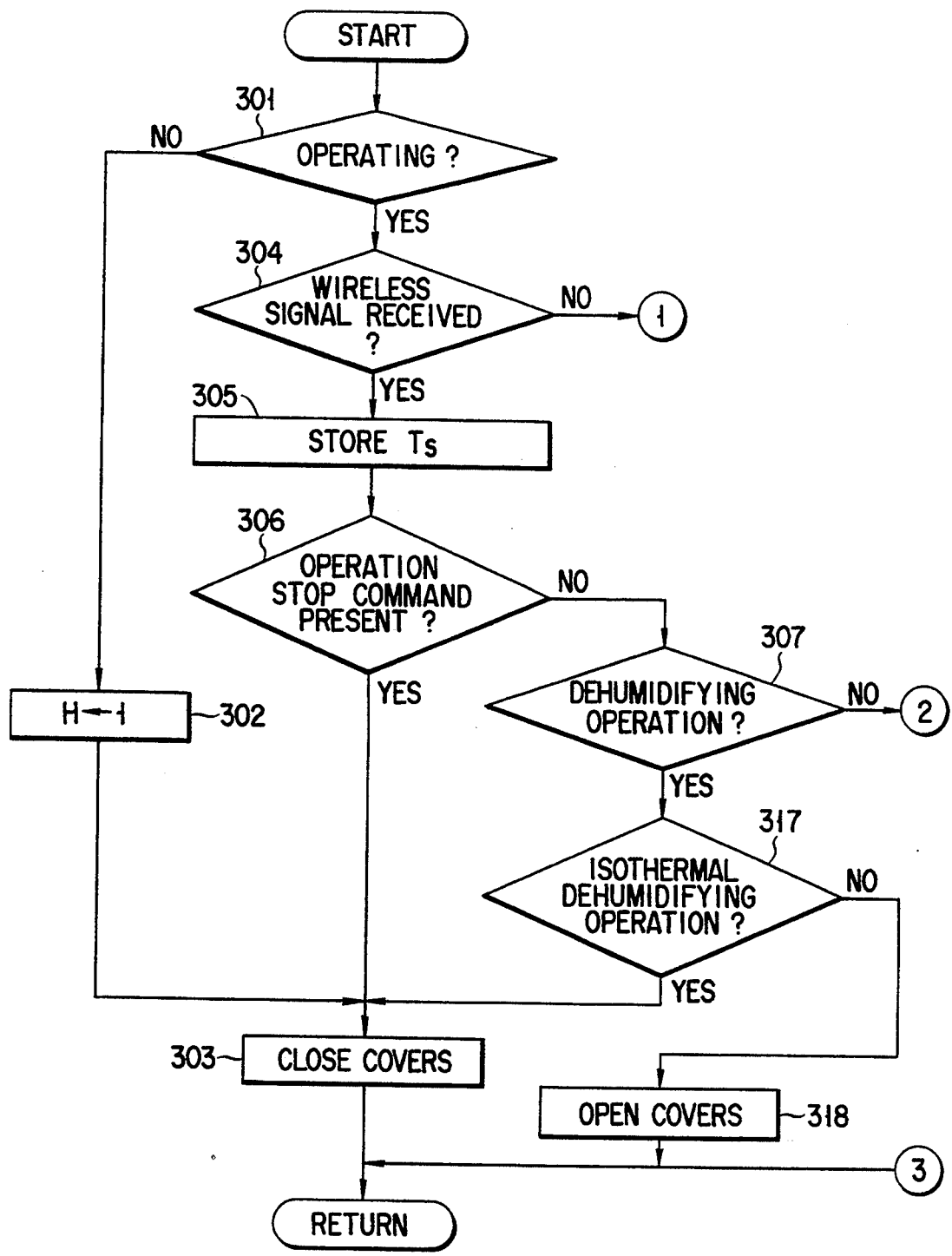
FIGS. 7A and 7B are flow charts for explaining the operation of the controller of the first embodiment of the present invention.
Figure 7B:
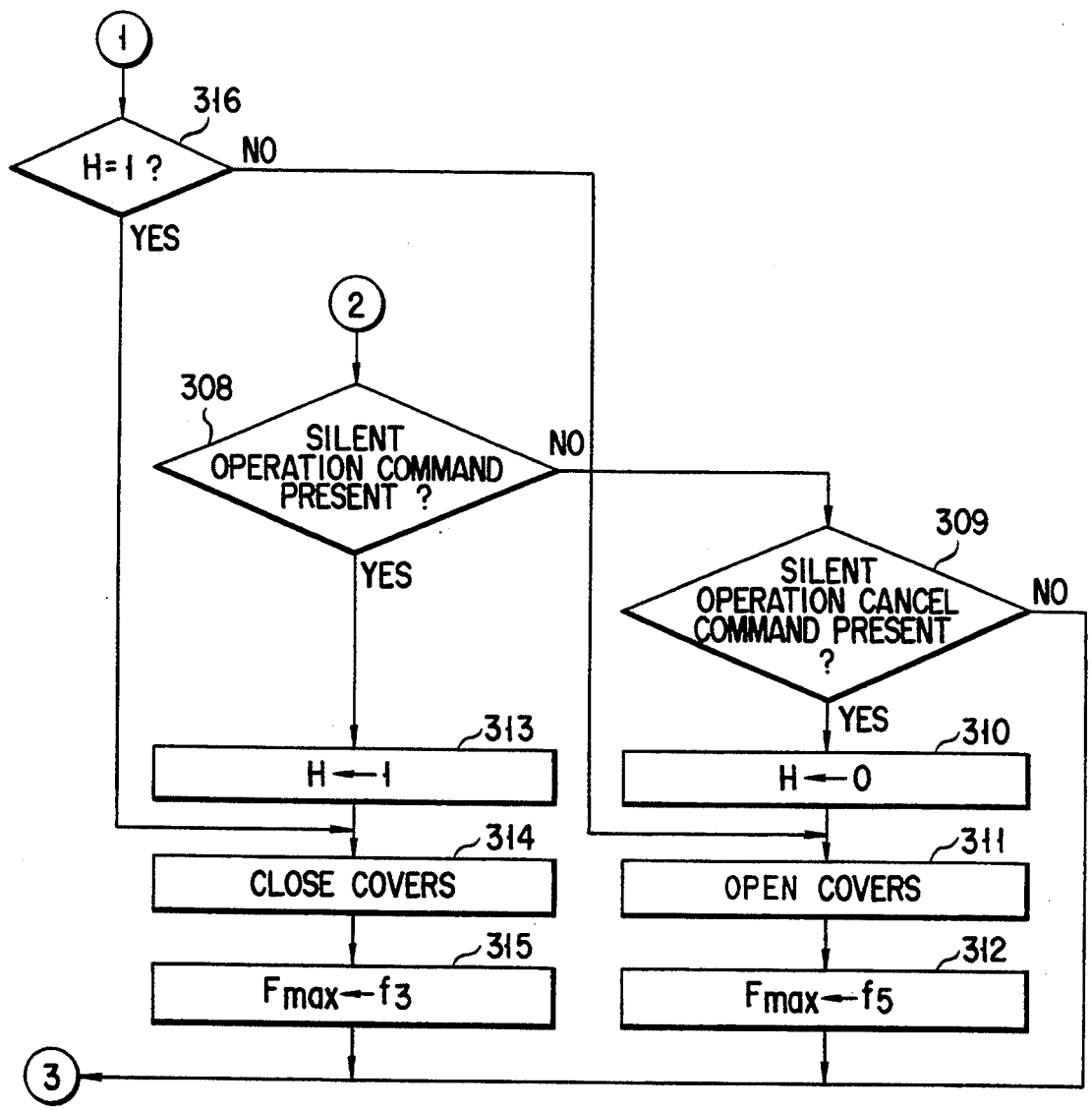
Figure 8:
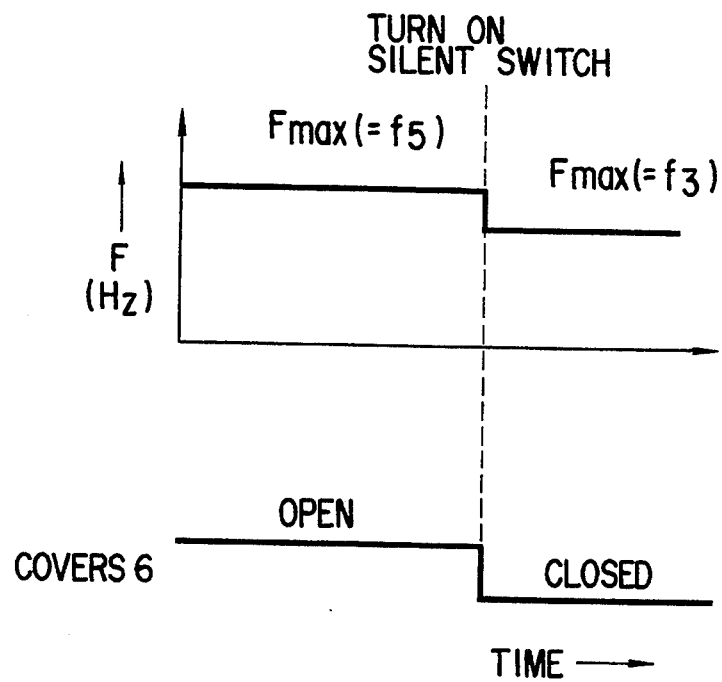
FIG. 8 is a timing chart for explaining the operation of the controller according to the first embodiment of the present invention.

Control over the respective covers 6 and the silent operation will be described with reference to the flow chart of FIGS. 7A and 7B, and the timing chart of FIG. 8.

It is discriminated whether the operation is being performed or is stopped (step 301). When the operation is stopped, a flag H for storing the opening/closing state of the covers 6 is set at "1" (step 302), and the covers 6 are closed (step 303). When the covers 6 are closed, the inlet 5 is closed, and dust will not enter the indoor unit 3.

During operation, when a wireless signal from the operation unit 70 is received by the receiving section 80 (Y instep 304), data of the set temperature $T_s$ is sent to the frequency limiting section 84 and stored (step 305). If an operation stop command is present (Y in step 306), the covers 6 are closed (step 303).

If the cooling or heating operation is being executed (N in steps 306 and 307), the presence/absence of the silent operation command is discriminated (step 308).

If there is no silent operation command (the silent operation mode is not set) (the same as that the silent operation cancel command is present; Y in step 309), the flag H is set at "0" (step 310), and the operation of the first control means is selected. That is, the covers 6 are opened (step 311). When the covers 6 are opened, the inlet 5 is opened, and a large quantity of indoor air is taken in by the indoor unit 3. Hence, the heat exchange quantity is increased to the maximum.

In addition, upon selection of the operation of the first control means, the maximum operating frequency $F_{max}$ as the upper limit of the operating frequency F is set at the maximum value $f_5$ ($>f_3$) (step 312). Hence, a sufficiently high cooling or heating capability is provided, owing to opening of the inlet 5 as well.

If a silent operation command is present (the silent operation mode is set) (Y in step 308), the flag H is set at "1" (step 313), and the operation of the second control means is selected. That is, the covers 6 are closed (step 314). When the covers 6 are closed, the inlet 5 is closed, and the sound caused by the hissing indoor fan 32 and the sound caused by the refrigerant flowing in the indoor heat exchanger 31 will not leak to the ceiling of the room through the inlet 5. Hence, the noise is decreased, and a silent operation can be performed. The silent operation is optimum for, e.g., ensuring a good night sleep.

However, when the inlet 5 is closed, the heat exchange quantity of the indoor heat exchanger 31 is decreased. Therefore, during the cooling operation when the indoor heat exchanger 31 serves as the evaporator, the indoor heat exchanger 31 is sometimes frozen. Also, during the heating operation when the indoor heat exchanger 31 serves as the condenser, the high-pressure side pressure of the refrigerating cycle is abnormally increased to adversely affect the equipment of the refrigerating cycle.

For this reason, upon selection of the operation of the second control means, the maximum operating frequency $F_{max}$ as the upper limit of the operating frequency F is limited to the value $f_3$ ($<f_5$) (step 315). By this limitation, the evaporating capability is suppressed in the cooling operation, and the condensing capability is suppressed in the heating operation. That is, freezing of the indoor heat exchanger 31 in the cooling operation is prevented, and an abnormal increase in high-pressure side pressure in the heating operation is prevented.

If a silent operation cancel command is present (Y in step 309), the flag H is set at "0" (step 310), the operation of the first control means is selected, and the covers 6 are opened (step 311).

Thereafter, the state of the flag H is discriminated (step 316), and the open/closed state of the covers 6 is maintained in accordance with the discrimination result.

While the dehumidifying operation on the cooling side is executed (N in step 306, Y in step 307, and N in step 317), the covers 6 are opened regardless of whether the silent operation command or the silent operation cancel command is present (step 318). Thus, the heat exchange quantity of the indoor heat exchanger 31 is increased to the maximum.

While the isothermal dehumidifying operation is executed (N in step 306, Y in step 307, and Y in step 317), the covers 6 are closed regardless of whether the silent operation command or the silent operation stop command is present (step 303).

In the isothermal dehumidifying operation, the covers 6 are closed due to the following reason.

Figure 9:
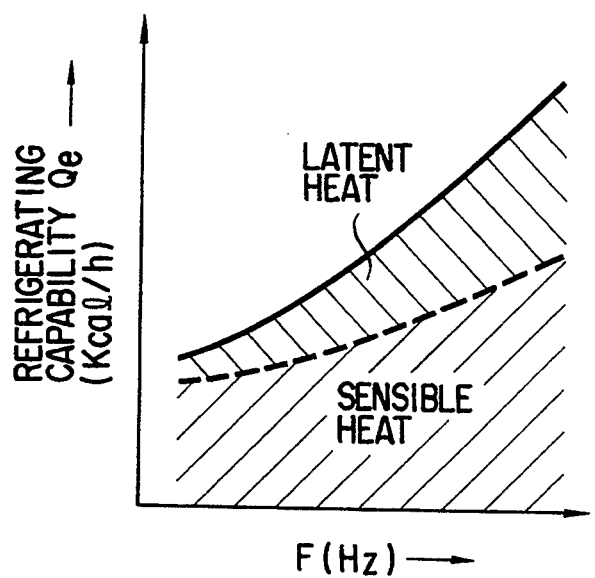
FIG. 9 is a graph showing the characteristics of the refrigerating cycle of each embodiment.

More specifically, the refrigerating cycle has characteristics as shown in FIGS. 9, 10, and 11. In the isothermal dehumidifying operation wherein the operating frequency F is set at the low frequency $f_1$, the evaporative temperature of the refrigerant in the indoor heat exchanger 31 is increased, and in an extreme case, the temperature of the taken air cannot be maintained at the dew point temperature or less, and the dehumidifying effect cannot be obtained.

Therefore, the covers 6 are closed to decrease the heat exchange quantity, thereby decreasing the heat exchange efficiency of the indoor heat exchanger 31. The heat exchange efficiency of a heat exchanger is expressed by the following equation:

$$Ke = \frac{1}{\left(\frac{1}{\alpha_a \cdot S_z} + \frac{E}{\alpha_R \cdot S_n}\right)} \text{ (kg/h)}$$

$$Q_e = K_e \cdot (i_a - i_e) \text{ (kcal/h)}$$

$Q_e$: refrigerating capability (kcal/h)
$K_e$: evaporation heat exchange rate (kg/h)
$i_a$: taken-air enthalpy (kcal/kg)
$i_e$: evaporation enthalpy (kcal/kg)
$\alpha_a$: heat transfer rate of air (kcal/m²h°C)
$\alpha_R$: heat transfer rate of refrigerating cycle (kcal/m²h°C.)
$S_z$: area of heat-radiating fin (m²)
$S_n$: inner circumferential area of heat exchange pipe (m²)
E: conversion rate of temperature enthalpy More specifically, to decrease the heat exchange quantity of the indoor heat exchanger 31 by closing the covers 6 is equivalent to substantially decrease the area $S_z$ of the heat-radiating fin and the inner circumferential area $S_n$ of the heat exchange pipe, and accordingly the evaporation heat exchange rate $K_e$ is decreased. When the evaporation heat exchange rate $K_e$ is decreased, the evaporative temperature is decreased, and the temperature of the taken air is maintained at the dew point temperature or less. Thus, a sufficiently high dehumidifying effect can be obtained. In FIG. 11, the matching point of the compressing capability and the refrigerating capability $Q_e$ in this case is indicated by a point C.

The second embodiment of the present invention will be described.

Figure 12:
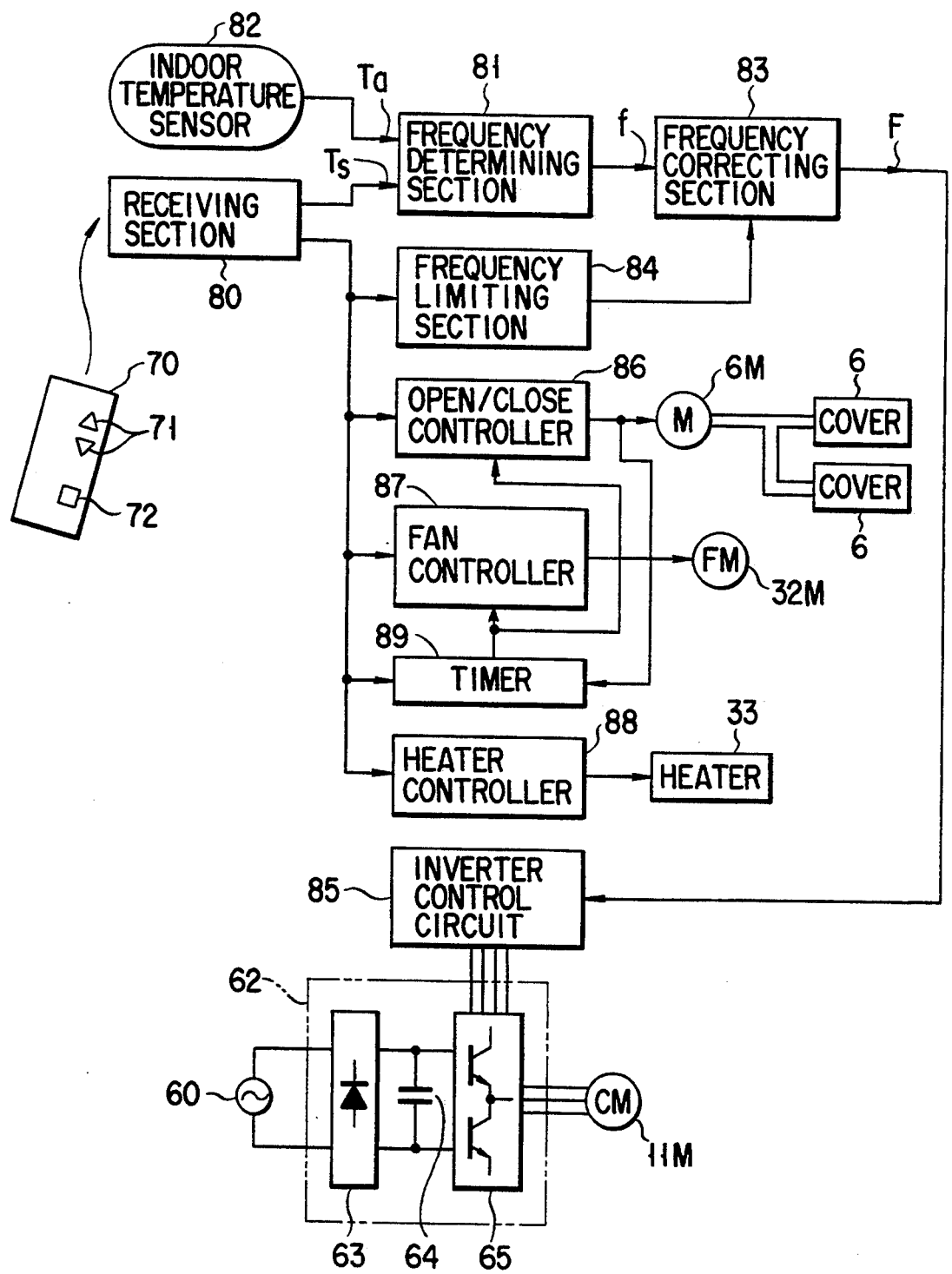
FIG. 12 is a block diagram of the main part of a controller according the second embodiment of the present invention.

In this embodiment, as shown in FIG. 12, a controller 40 is provided with a timer 89. When covers 6 are opened by an open/close controller 86, the timer 89 starts counting time t upon reception of an operation stop command, and outputs an end command when the time count t reaches a preset value $t_1$. The end command is supplied to the open/close controller 86 and a fan controller 87.

The open/close controller 86 does not immediately close the covers 6 immediately even when it receives the operation stop command, but closes them upon reception of the end command from the timer 89.

The fan controller 87 does not immediately stop the operation of an indoor fan 32 even when it receives the operation stop command, but stops it upon reception of the end command from the timer 89.

Figure 13A:
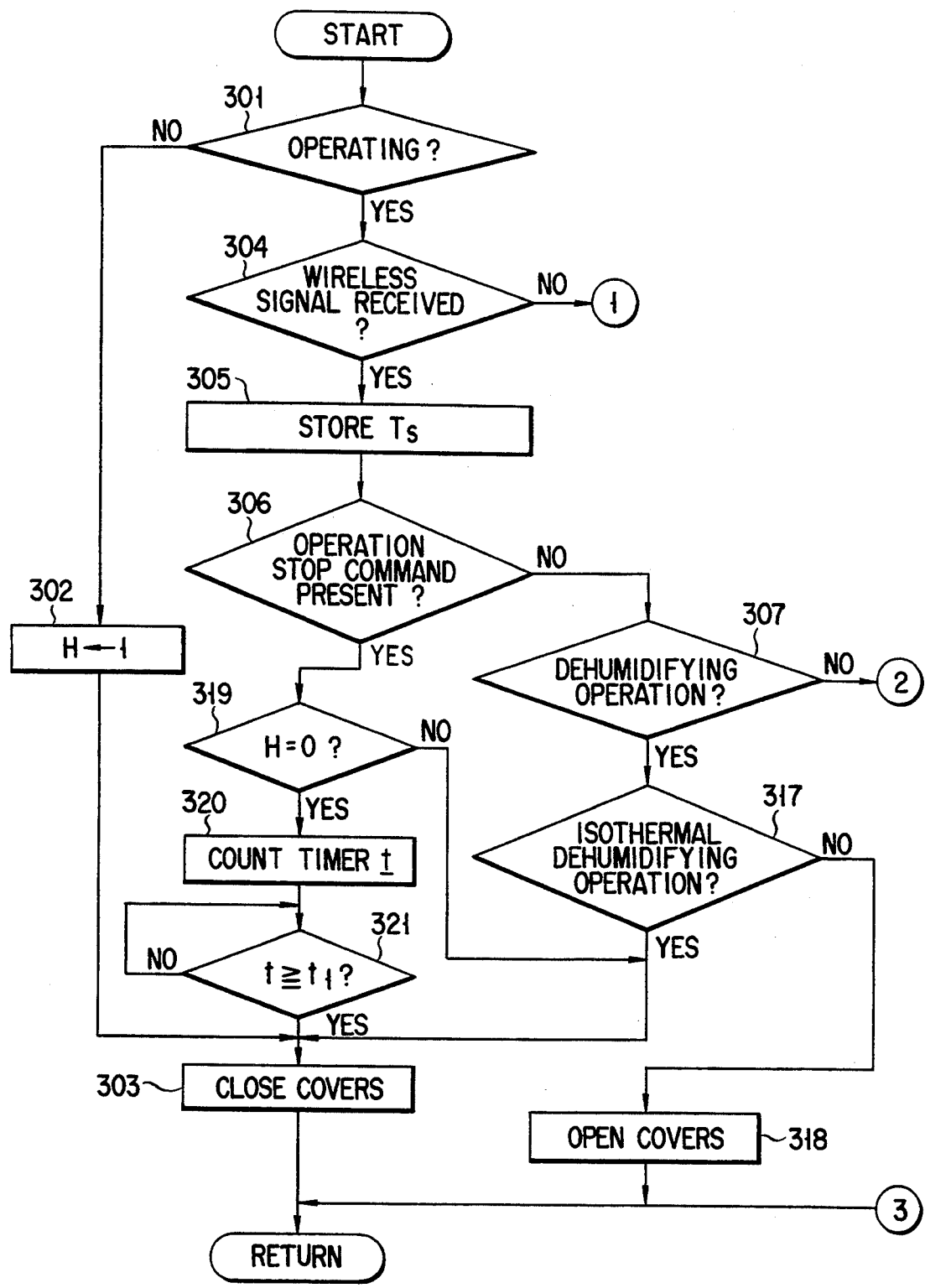
FIGS. 13A and 13B are flow charts for explaining the operation of the controller according to the second embodiment of the present invention.
Figure 13B:
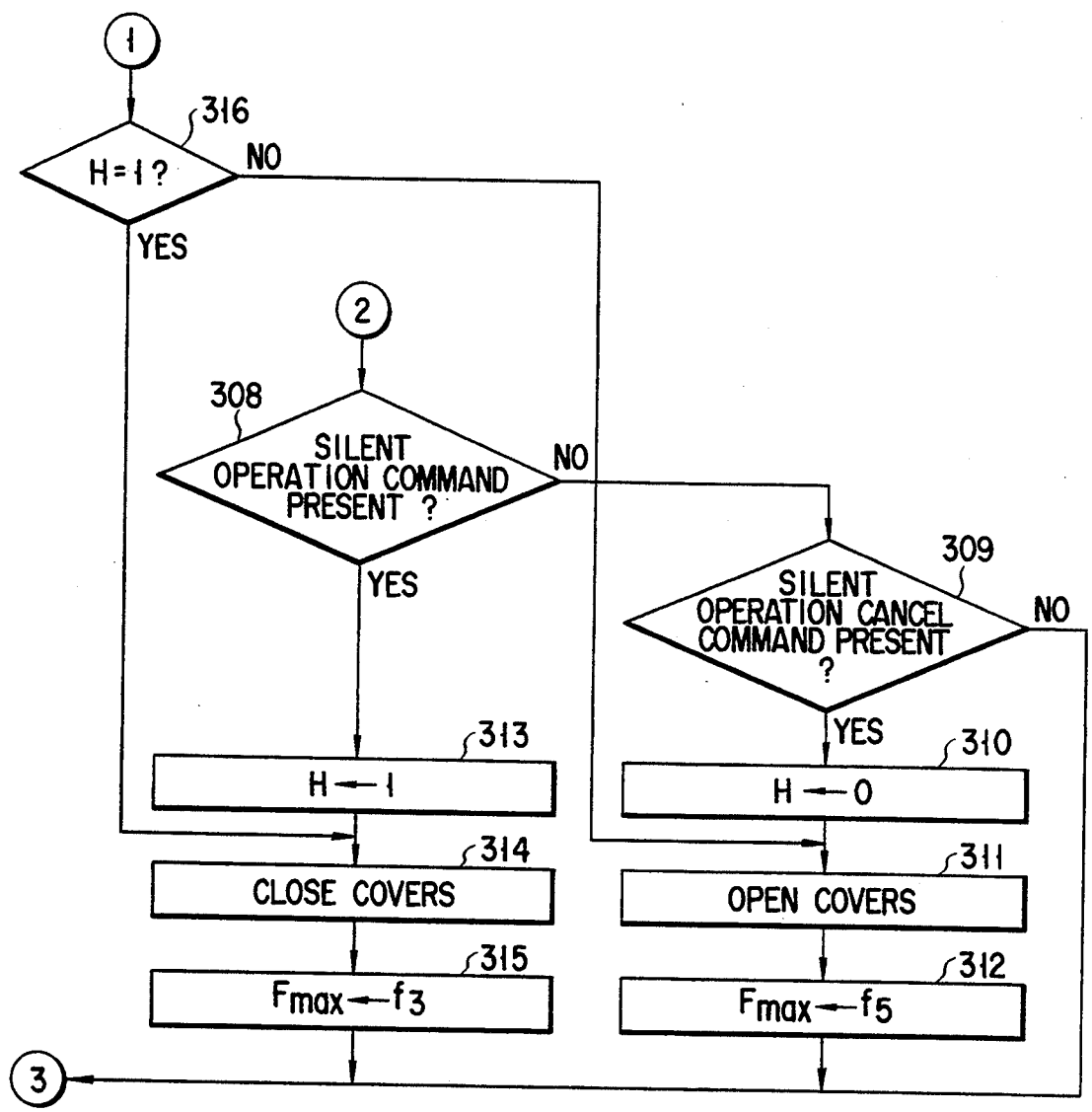

FIGS. 13A and 13B show the flow charts of the operation of this air conditioning apparatus. In the flow chart of FIGS. 13A and 13B, step 319 for discriminating the open state of the covers 6, step 320 for starting counting the time t, and step 321 for comparing the time count t with the preset value $t_1$ are added.

Other arrangements and operations of this air conditioning apparatus are the same as those of the first embodiment.

More specifically, when the operation is stopped, the covers 6 is closed so that dust will not enter an inlet 5. However, in the dehumidifying operation (and the heating operation), since an electric heater 33 operates, if the covers 6 are closed immediately, heat of the electric heater 33 is unpreferably filled in a box 50 of an indoor unit 3.

Therefore, in the second embodiment, the closing operation of the covers 6 and the operation stop of the electric heater 33 are prolonged, and heat of the electric heater 33 is forcibly dissipated to the outside of the box 50 during this prolonged period of time. Then, thermal deformation of the components in the box 50 is prevented, and the safety is improved.

The third embodiment of the present invention will be described.

In the third embodiment, as shown in FIG. 14, a silent operation switch 72 is omitted from an operation unit 70. An operating frequency f determined by a frequency determining section 81 directly serves as an operating frequency F, and is informed to an inverter control circuit 85 and a low-frequency discriminating section 90.

The low-frequency discriminating section 90 discriminates whether the operating frequency F is equal to or less than a set value $F_s$. The discrimination result is sent to an open/close controller 86. The set value $F_s$ corresponds to a low frequency $f_2$ ($<f_3$).

The open/close controller 86 controls to drive a motor 6M in accordance with the discrimination result of the low-frequency discriminating section 90.

Figure 15:
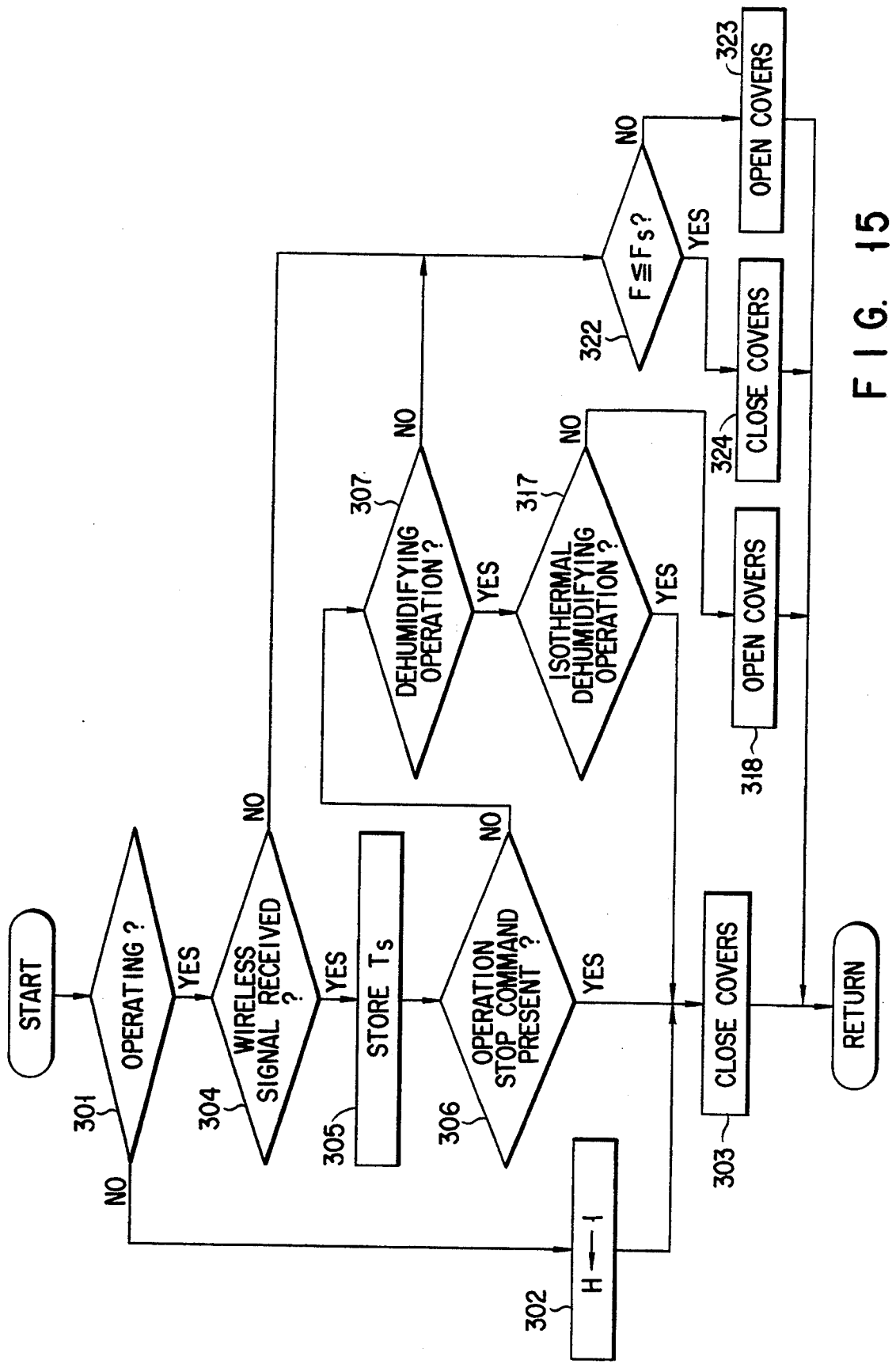
FIG. 15 is a flow chart for explaining the operation of the controller according to the third embodiment of the present invention.

The operation of this air conditioning apparatus is shown in the flow chart of FIG. 15. In FIG. 15, in place of control of the silent operation, step 322 for comparing the operating frequency F with the set value $F_s$ and steps 323 and 324 for opening/closing covers 6 in accordance with the comparison result are added.

Other arrangements and operations of this air conditioning apparatus are the same as those of the first embodiment.

When the air conditioning load is large and the operating frequency F is set to a large value, e.g., at the start of the operation, the operating sound is not very noisy. Hence, in this case, the covers 6 are open (step 323).

As the operation progresses and the air conditioning load is decreased, the operating frequency F is decreased. When the operating frequency F is decreased to the set value $F_s$, the covers 6 are closed (step 324).

More specifically, in the safe operation wherein the air conditioning load is decreased, since the operation sound becomes noisy, the covers 6 are closed. When the covers 6 are closed, the sound caused by a hissing indoor fan 32 and the sound caused by the refrigerant flowing in an indoor heat exchanger 31 do not leak to the outside through an inlet 5. Hence, a silent operation is performed and discomfort is not imposed on the person in the room.

When an antistatic agent is coated on the surface of an inlet grill 51 provided in an inlet 4 of an indoor unit 3, the amount of dust to be taken in into the indoor unit 3 is decreased. Then, contamination around the inlet 4 is decreased, and mold is suppressed. In addition, dust scattering at the start of the operation is prevented.

A blocking plate 56 is provided between an electric heater 33 and the indoor heat exchanger 31. The thermal effects on the indoor heat exchanger 31 in a case wherein no blocking plate 56 is provided and a case wherein a blocking plate 56 is provided are expressed as follows.

Equation (1) expresses the thermal effect obtained when no blocking plate 56 is provided, and equation (2) expresses the thermal effect obtained when the blocking plate 56 is provided. It is apparent that when the blocking plate 56 is provided, the thermal effect on the indoor heat exchanger 31 is decreased to 10% or less.

$$q_{1 \to 2} = A_1[\epsilon_1 E_1 - a_2 E_2] \quad (1)$$

$$= 4.88 \cdot A_1 \left[ \epsilon_1 \left( \frac{T_1}{100} \right)^4 - a_2 \left( \frac{T_2}{100} \right)^4 \right]$$

$$= 4.88 \times 0.0178 \times \left[ 0.95 \cdot \left( \frac{463}{100} \right)^4 - 0.055 \cdot \left( \frac{287}{100} \right)^4 \right]$$

$$= 37.6 \text{ kcal/hr} = 43.7 \text{ W}$$

$A_1$: surface area of electric heater 0.0178 (m$^2$)

$\epsilon_1$: emissivity of electric heater: 0.95
$a_2$: absorption rate of indoor heat exchanger: 0.055
$T_1$: temperature of electric heater: 463 (°K)
$T_2$: temperature of indoor heat exchanger: 287 (°K)

$$q_{1 \to 2} = A_1'[\epsilon_1' \cdot E_1' - a_2 \cdot E_2] \quad (2)$$

$$= 4.88 \times 0.0178 \times \left[ 0.23 \cdot \left( \frac{342}{100} \right)^4 - 0.055 \cdot \left( \frac{287}{100} \right)^4 \right]$$

$$= 2.4 \text{ kcal/hr} = 2.8 \text{ W}$$

$A_1'$: surface area of blocking plate: 0.0178 (m$^2$)
$\epsilon_1'$: emissivity of blocking plate: 0.23
$T_1'$: temperature of blocking plate: 342 (°K)
$T_2'$: temperature of indoor heat exchanger: 287 (°K)

Figure 16:
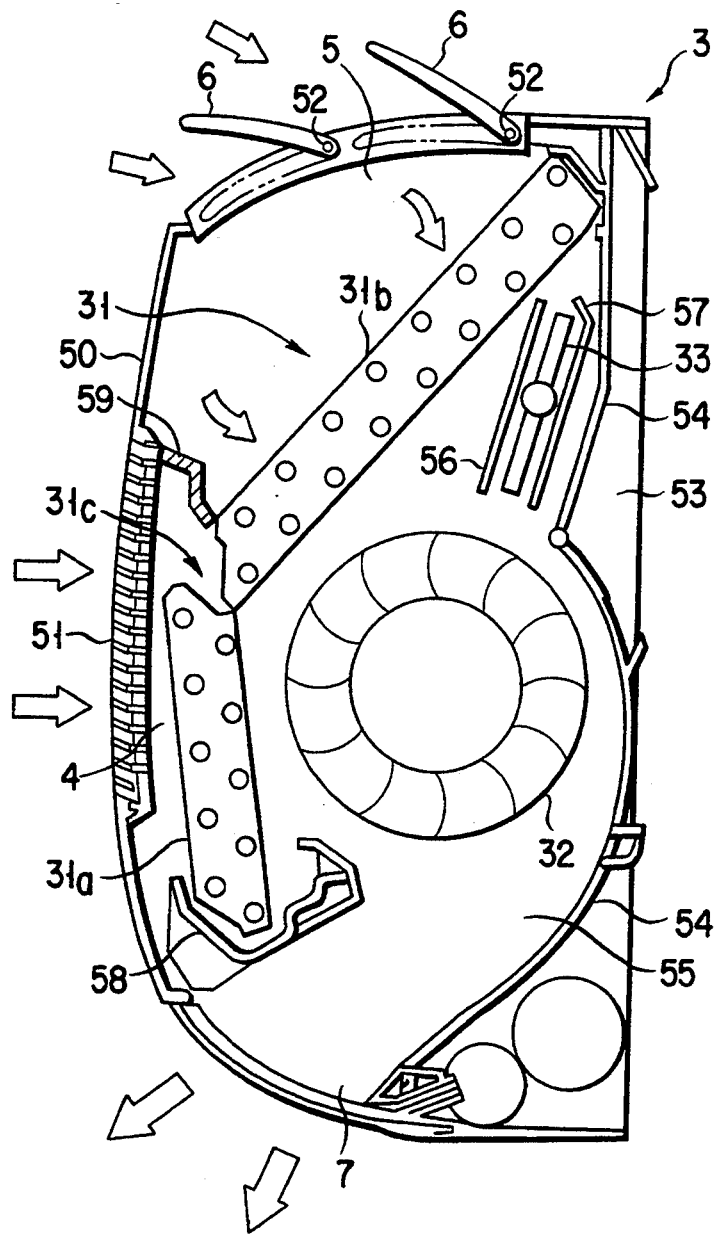
FIG. 16 is a diagram showing a modification of an indoor unit of each embodiment in detail.

In the indoor unit 3, as shown in FIG. 16, a partition plate 59 may be provided between the upper end of the inlet 4 and the lower end of an lower heat exchanger 31$a$ of the indoor heat exchanger 31.

The partition plate 59 guides air taken in through the inlet 4 to only an upper heat exchanger 31$b$ and air taken in through the inlet 5 to only the lower heat exchanger 31$a$. Therefore, when the covers 6 are closed, air does not flow to the lower heat exchanger 31$a$ but flows to only the upper heat exchanger 31$b$. That is, the capacity of the indoor heat exchanger 31 can be changed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air conditioning apparatus having a plurality of inlets for taking in indoor air at a plurality of portions of a main body thereof, comprising:

at least an openable/closable cover provided to any one of said plurality of inlets;
   first control means for opening said cover to execute a first operation;
   second control means for closing said cover to execute a second operation;
   setting means for setting a silent operation mode; and
   selecting means for selecting said first operation when the silent operation mode is not set, thereby causing said first control means to open said cover, and for selecting said second operation when the silent operation mode is set, thereby causing said second control means to close said cover.

2. An apparatus according to claim 1, wherein said plurality of inlets comprise a first inlet formed at a front portion of said main body and a second inlet formed at an upper portion of said main body.

3. An apparatus according to claim 2, wherein said cover is provided at said second inlet.

4. An apparatus according to claim 1, further comprising:

a compressor for taking in, compressing, and discharging a refrigerant;
   an outdoor heat exchanger for exchanging heat of the refrigerant flowing thereto with the outdoor air;
   an indoor heat exchanger for exchanging heat of the refrigerant flowing thereto with the indoor air, said indoor heat exchanger having its air inlet connected to said plurality of inlets;

an indoor fan for taking in the indoor air through said plurality of inlets and discharging taken air into a room through said indoor heat exchanger;

a refrigerating cycle constituted by connecting said compressor, said outdoor heat exchanger, and said indoor heat exchanger; and control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, and operating said indoor fan, thus executing a cooling operation.

5. An apparatus according to claim 1, further comprising:

a compressor for taking in, compressing, and discharging a refrigerant;

an outdoor heat exchanger for exchanging heat of the refrigerant flowing thereto with the outdoor air;

an indoor heat exchanger for exchanging heat of the refrigerant flowing thereto with the indoor air, said indoor heat exchanger having its air inlet connected to said plurality of inlets;

an indoor fan for taking in the indoor air through said plurality of inlets and discharging taken air into a room through said indoor heat exchanger;

a refrigerating cycle constituted by connecting said compressor, said outdoor heat exchanger, and said indoor heat exchanger;

detecting means for detecting an air conditioning load based on a temperature of the indoor air;

control means for controlling a capability of said compressor in accordance with the detected air conditioning load; and limiting means for limiting an upper limit of said compressor upon selection of the operation of said second control means.

6. An air conditioning apparatus having a plurality of inlets for taking in indoor air at a plurality of portions of a main body thereof, comprising:

at least an openable/closable cover provided to any one of said plurality of inlets;

first control means for opening said cover to execute an operation;

second control means for closing said cover to execute an operation;

a compressor for taking in, compressing, and discharging a refrigerant;

an outdoor heat exchanger for exchanging heat of the refrigerant flowing thereto with the outdoor air;

an indoor heat exchanger for exchanging heat of the refrigerant flowing thereto with the indoor air, said indoor heat exchanger having its air inlet connected to said plurality of inlets;

an indoor fan for taking in the indoor air through said plurality of inlets and discharging taken air into a room through said indoor heat exchanger;

a refrigerating cycle constituted by connecting said compressor, said outdoor heat exchanger, and said indoor heat exchanger;

detecting means for detecting an air conditioning lead based on a temperature of the indoor air;

control means for controlling a capability of said compressor in accordance with the detected air conditioning load; and selecting means for selecting an operation of said first control means when said compressor has a capability of not less than a predetermined value, and an operation of said second control means when said compressor has a capability of not more than the predetermined value.

7. An air conditioning apparatus having a plurality of inlets for taking in indoor air at a plurality of portions of a main body thereof, comprising:

at least an openable/closable cover provided to any one of said plurality of inlets;

first control means for opening said cover to execute an operation;

second control means for closing said cover to execute an operation;

a compressor for taking in, compressing, and discharging a refrigerant;

an outdoor heat exchanger for exchanging heat of the refrigerant flowing thereto with the outdoor air;

an indoor heat exchanger for exchanging heat of the refrigerant flowing thereto with the indoor air, said indoor heat exchanger having its air inlet connected to said plurality of inlets;

an indoor fan for taking in the indoor air through said plurality of inlets and discharging taken air into a room through said indoor heat exchanger;

a reheater for heating air passing through said indoor heat exchanger;

a refrigerating cycle constituted by connecting said compressor, said outdoor heat exchanger, and said indoor heat exchanger;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, and operating said indoor fan, thus executing a cooling operation;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, operating said indoor fan to operate said reheater, and setting a capability of said compressor to not more than a predetermined value, thus executing an isothermal dehumidifying operation; and selecting means for selecting an operation of said first control means in the cooling operation, and an operation of said second control means in the isothermal dehumidifying operation.

8. An apparatus according to claim 7, further comprising:

detecting means for detecting an air conditioning load based on a temperature of the indoor air; and control means for controlling the capability of said compressor in the cooling and heating operations in accordance with the detected air conditioning load.

9. An air conditioning apparatus having a plurality of inlets for taking in indoor air at a plurality of portions of a main body thereof, comprising:

at least an openable/closable cover provided to any one of said plurality of inlets;

first control means for opening said cover to execute an operation;

second control means for closing said cover to execute an operation;

a compressor for taking in, compressing, and discharging a refrigerant;

an outdoor heat exchanger for exchanging heat of the refrigerant flowing thereto with the outdoor air;

an indoor heat exchanger for exchanging heat of the refrigerant flowing thereto with the indoor air, said indoor heat exchanger having its air inlet connected to said plurality of inlets;

an indoor fan for taking in the indoor air through said plurality of inlets and discharging taken air into a room through said indoor heat exchanger;

a reheater for heating air passing through said indoor heat exchanger;

a refrigerating cycle constituted by connecting said compressor, said outdoor heat exchanger, and said indoor heat exchanger;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, and operating said indoor fan, thus executing a cooling operation;

control means for flowing the refrigerant discharged from said compressor to said indoor heat exchanger, flowing the refrigerant passing through said indoor heat exchanger to said outdoor heat exchanger, and returning the refrigerant passing through said outdoor heat exchanger to said compressor, thus executing a heating operation;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, operating said indoor fan to operate said reheater, and setting a capability of said compressor to not more than a predetermined value, thus executing an isothermal dehumidifying operation; and selecting means for selecting an operation of either said first or second control means in the cooling and heating operations, and an operation of said second control means in the isothermal dehumidifying operation.

10. An apparatus according to claim 9, further comprising:

detecting means for detecting an air conditioning load based on a temperature of the indoor air; and control means for controlling the capability of said compressor in the cooling and heating operations in accordance with the detected air conditioning load.

11. An air conditioning apparatus having a plurality of inlets for taking in indoor air at a plurality of portions of a main body thereof, comprising:

at least an openable/closable cover provided to any one of said plurality of inlets;

first control means for opening said cover to execute an operation;

second control means for closing said cover to execute an operation;

a compressor for taking in, compressing, and discharging a refrigerant;

an outdoor heat exchanger for exchanging heat of the refrigerant flowing thereto with the outdoor air;

an indoor heat exchanger for exchanging heat of the refrigerant flowing thereto with the indoor air, said indoor heat exchanger having its air inlet connected to said plurality of inlets;

an indoor fan for taking in the indoor air through said plurality of inlets and discharging taken air into a room through said indoor heat exchanger;

a reheater for heating air passing through said indoor heat exchanger;

a refrigerating cycle constituted by connecting said compressor, said outdoor heat exchanger, and said indoor heat exchanger;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, and operating said indoor fan, thus executing a cooling operation;

control means for flowing the refrigerant discharged from said compressor to said indoor heat exchanger, flowing the refrigerant passing through said indoor heat exchanger to said outdoor heat exchanger, and returning the refrigerant passing through said outdoor heat exchanger to said compressor, thus executing a heating operation;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, operating said indoor fan to operate said reheater, and setting a capability of said compressor to not less than a predetermined value, thus executing dehumidifying operation on the cooling side;

control means for flowing the refrigerant discharged from said compressor to said outdoor heat exchanger, flowing the refrigerant passing through said outdoor heat exchanger to said indoor heat exchanger, returning the refrigerant passing through said indoor heat exchanger to said compressor, operating said indoor fan to operate said reheater, and setting the capability of said compressor to not more than a predetermined value, thus executing an isothermal dehumidifying operation; and selecting means for selecting an operation of either said first or second control means in the cooling and heating operations, an operation of said first control means in the dehumidifying operation on the cooling side, and an operation of said second control means in the isothermal dehumidifying operation.

12. An apparatus according to claim 11, further comprising:

detecting means for detecting an air conditioning load based on a temperature of the indoor air; and control means for controlling the capability of said compressor in the cooling and heating operations in accordance with the detected air conditioning load.

* * * * *